July 1, 1930. A. PAIS 1,769,752
HEATING DEVICE WITH HEAT ACCUMULATORS
Original Filed Nov. 19, 1926
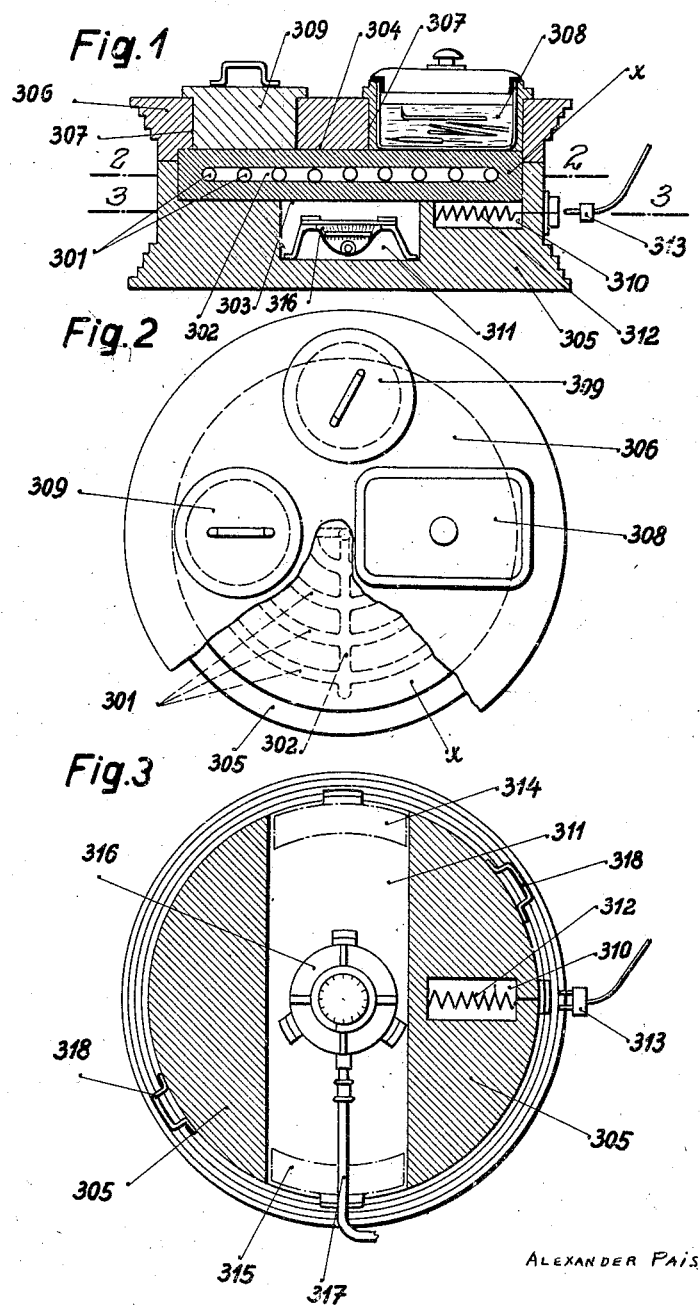
ALEXANDER PAIS
INVENTOR
BY *Otto Munk*
*his* ATTORNEY Patented July 1, 1930

1,769,752

UNITED STATES PATENT OFFICE

ALEXANDER PAIS, OF BUCHAREST, RUMANIA

HEATING DEVICE WITH HEAT ACCUMULATORS

Original application filed November 19, 1926, Serial No. 149,372, and in Austria November 19, 1925. Divided and this application filed April 6, 1928. Serial No. 267,976.

This invention relates to improvements in heating devices having heat accumulators and the present application is a division of my co-pending application Serial Number 149,372 filed November 19, 1926.

In order to provide economical heating arrangement for all kinds, very many different kinds of heating devices have been proposed comprising a heating body with a temperature equalizing medium. A known arrangement is to provide as a heating body a metal block which is heated from a source of heat and which is provided internally with a plurality of interconnected passages charged once and for all with a temperature equalizing medium, the metal block being completely enveloped in heat insulating material, excepting at those parts of its surface which cooperate with the heat source, and at those parts of its surface which serve to deliver up heat.

By utilizing the thermal phenomena on which the said known heating devices is based portable heating apparatus may be provided according to the present invention which as regards heat economy and ready application under various conditions are greatly superior to any heating apparatus heretofore proposed.

In the annexed drawing is shown a portable heating apparatus by way of example, Fig. 1 is a vertical section, Fig. 2 is a plan view partly in section on the line 2—2 Fig. 1, Fig. 3 is a section on the line 3—3 Fig. 1.

$x$ is a block, for instance circular in shape, made of some heat conducting material which encloses a gas tight and pressure tight channel system. This channel system consists of the annular channels 301 and the radial channels 302 communicating with each other at their points of intersection.

Into the channel system is filled once for ever a heat transmitting agent which in the temperature limits within which the accumulated heat is utilized is in the state of saturated vapour under pressure. 303 is the heat receiving and 304 is the heat transmitting face of the block $x$. The block is mounted in a base plate 305 of heat insulating material and covered by a plate 306 of the same material. The plate 306 is provided with recesses 307 extending down to the heat transmitting face 304 and serving to receive cooking vessels, for instance sterilizers 308. These recesses are closed by covers 309 of heat insulating material when the heating apparatus is out of use. In the base plate recesses 310, 311 are provided which extend up to the heat receiving face 303 of the block $x$ and serve to receive the heat sources. In the constructional form shown in the recess 310 an electric heating resistance 312 is mounted which may be connected to a source of electricity by means of plugs 313 and serves for heating the block $x$ electrically. The recess 311 extends diametrically through the base plate 305 and is adapted to be closed at both ends by covers 314 and 315 of heat insulating material. This recess 311 serves to receive a further source of heat as a gas or an alcohol or a petroleum burner 316 or the like may be used. In case of a gas burner one of the covers 315 is provided with a suitable opening for the gas pipe 317 to pass through. For facilitating transport the base plate 305 is provided with handles 318.

The heating apparatus described is compact and readily portable and as at its bottom side it is closed by heat insulating material and it may be placed on any table or other part of furniture. The block $x$ may be heated by a variety of sources of heat as may be required and each of such heat sources secures a rapid heating, but the block may also be heated by more than one source of heat at a time. The heat source 316 may also be removed from the recess 311 and utilized elsewhere when the block $x$ has been heated to a suitable temperature. The recess 311 is closed by the covers 314, 315 whereby the heat accumulated in the block is kept back therein for a long time. The apparatus is more particularly suitable for sick rooms in hospitals and the like where frequently at night boiling water is required for sterilizing or other purposes, but it may also be used for cooking purposes in general more particularly for cooking out of doors or on the dining table itself.

What I claim is:

1. In a heating apparatus the combination of a metallic block having a heat receiving and a heat transmitting face, a system of fluid tight channels within such block adapted to be filled with a heat transmitting agent, a heat insulating base plate supporting the said block and having a hollow space in it adjacent to the heat receiving face of the said block, such space being accessible from the outside, heat insulating elements adapted to surround such block on all sides and means for supplying heat to the heat receiving face of the said block, such means comprising removable heating means in the hollow space of the base plate.

2. In a heating apparatus the combination of a metallic block having a heat receiving and a heat transmitting face, a system of fluid tight channels within such block adapted to be filled with a heat transmitting agent, a heat insulating base plate supporting the said block and having a hollow space in it adjacent to the heat receiving face of the said block, such space being accessible from the outside by openings, removable heat insulating covers adapted to close such openings, heat insulating elements adapted to surround such block on all sides and means for supplying heat to the receiving face of the said block, such means comprising removable heating means in the hollow space of the base plate.

3. In a heating apparatus the combination of a metallic block in the form of a circular plate having a heat receiving face, and a heat transmitting face, of fluid tight circular channels and radial channels within such block intersecting and communicating with each other, such channels being adapted to be filled with a heat transmitting agent, a heat insulating base plate supporting the said block heat insulating elements adapted to surround such block on all sides and means for supplying heat to the heat receiving face of the said block.

In testimony whereof I affix my signature.

ALEXANDER PAIS.